123,988

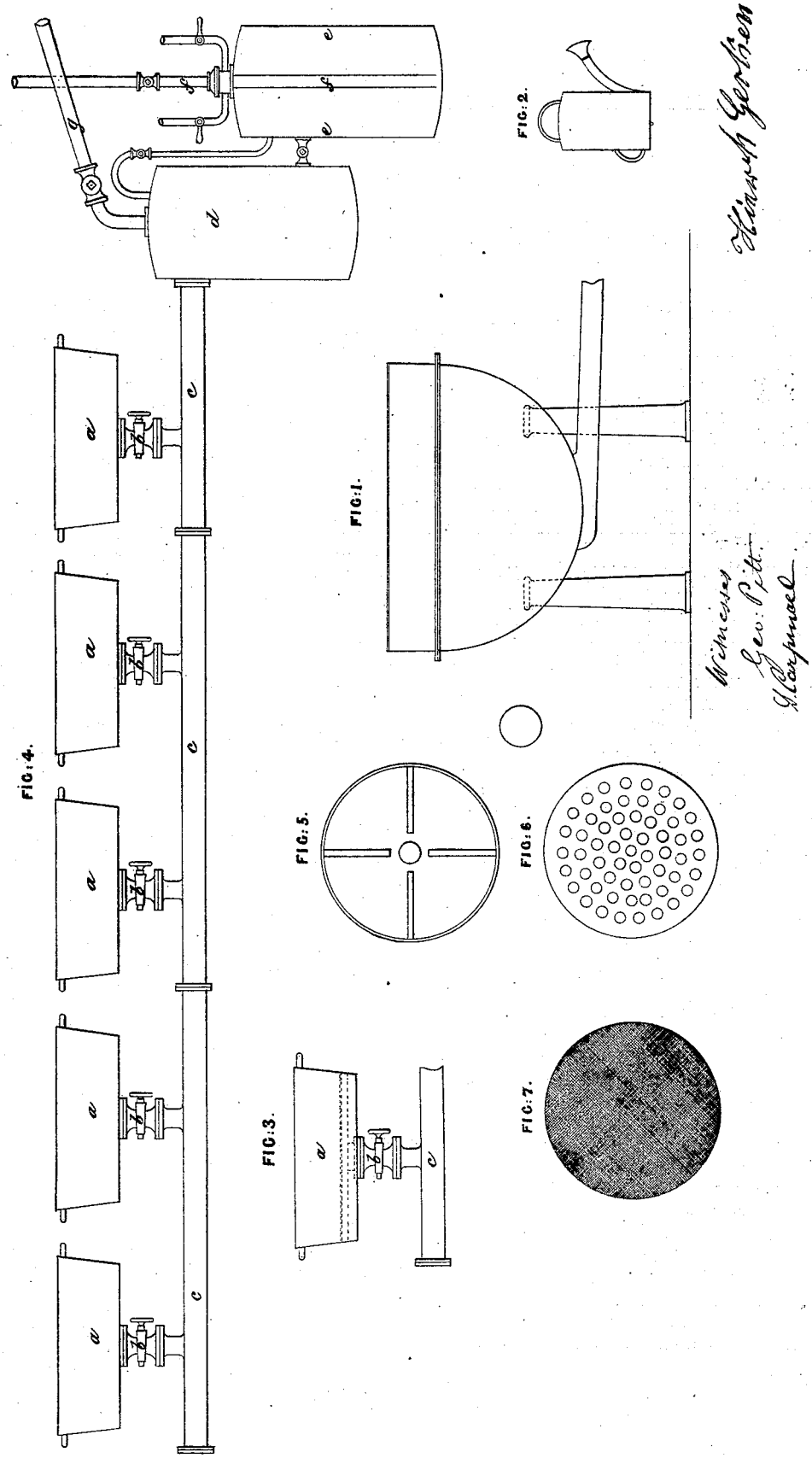

UNITED STATES PATENT OFFICE.

HENRI GERKEN, OF MIDDLESEX COUNTY, ENGLAND.

IMPROVEMENT IN PURIFYING SUGAR.

Specification forming part of Letters Patent No. 123,988, dated February 27, 1872; antedated February 17, 1872.

*To all whom it may concern:*

Be it known that I, HENRI GERKEN, of Leman street, in the county of Middlesex, England, a subject of the Emperor of Germany, have invented or discovered a new and useful "Improvement in Purifying Sugar;" and I, the said HENRI GERKEN, do hereby declare the nature of the said invention, and in what manner the same is to be performed, to be particularly described and ascertained in and by the following statement thereof; that is to say—

This invention has for its object improvements in purifying sugar, applicable especially to the treatment of raw sugars of the lowest qualities; and consists in the following combination of processes: The raw sugar is mixed with water to form a magma or paste, which is placed in vessels with perforated bottoms, beneath which a vacuum is maintained. The impurities are thus in great part drawn out and separated, and the separation is aided by sprinkling water from time to time upon the surface of the sugar. The sugar is then taken out of these vessels and is dissolved, filtered through charcoal, evaporated, and crystallized in the manner usual in sugar refining.

In order that my said invention may be most fully understood and readily carried into effect, I will proceed to describe more in detail the manner in which I prefer to conduct the operations.

I place the raw sugar in a large steam-jacketed pan, such as is shown at Figure 1, and I sprinkle it with water continually as the pan is filled by means of the water-pot, Fig. 2. The quantity of water used should be such as to bring the sugar to the state of a semi-fluid magma, and a little steam is admitted to the jacket so as gradually to raise the temperature of the mixture to about 155° Fahrenheit. From this pan the sugar is transferred to trays, one of which is shown at $a$ in Fig. 3. It has an opening in the bottom, around which there is a flat seat, and it rests when at work on a corresponding face upon the stop-cock $b$, which is upon a pipe, $c$, in which a partial vacuum is maintained by means of an air-pump. An India-rubber ring is employed to make an air-tight joint. The pipe $c$ receives a large number of trays in the manner shown at Fig. 4. On the bottom of each tray ribs about an inch high are fixed in the manner shown at Fig. 5, and on these the perforated bottom or partition, Fig. 6, is secured. A fine wire-gauze cloth, of copper or other material, shown at Fig. 7, is laid upon the perforated bottom, and so the tray is prepared to receive the sugar. Each tray holds about two hundred to two hundred and thirty pounds of sugar. When it is filled the stop-cock $b$ beneath it is opened, and as soon as the sugar is dry, water is sprinkled over it with the water-pot, and this is done several times. The sugar will now form a hard cake in the tray, much whiter than the raw sugar from which it was made. It is the tendency to cake, which the sugars of low quality have, which prevents the use of the centrifugal machine to whiten them. When this process is finished the stop-cock $b$ is closed, the tray is removed, and the sugar is turned out of it.

The succeeding processes are those of ordinary sugar refining. The whitened sugar cake is dissolved, filtered through animal charcoal, evaporated, and crystallized.

A very great saving in animal charcoal results from the preparation which the sugar has thus undergone. The sirup draining from the trays passes into a receiver, $d$, and from thence into a second vessel, $e$, which is emptied from time to time. The connection between $d$ and $e$ is closed when the vessel $e$ is to be emptied and steam is admitted to the top of this vessel. Thus the sirup is forced up the pipe $f$ into a receiving-cistern conveniently situated. $g$ is the connecting-pipe leading to the air-pump, by which the partial vacuum is maintained. The power of the pump should be such as to maintain twenty inches of vacuum or more.

Having thus described the nature of my invention, and the manner of performing the same, I would have it understood that I do not confine myself to the exact details described; but

What I claim is—

The combined processes for the purification of sugar, consisting in mixing the raw sugar with water, as set forth, placing the same in a series of open trays or vessels having perforated bottoms, sprinkling the sugar with water from time to time as it becomes dry, and partially extracting the impurities therefrom by exhaustion or suction, and the refining the partially-purified product by the ordinary refining processes—dissolving, filtering through charcoal, evaporating, and crystallizing—substantially as described.

H. GERKEN.

Witnesses:
G. F. WARREN,
WILMER M. HARRIS,
*Both of No. 17 Gracechurch Street, London.*